Dec. 12, 1939.   R. H. GODDARD   2,183,314
GYROSCOPIC APPARATUS FOR DIRECTING FLIGHT
Filed Jan. 31, 1939    2 Sheets-Sheet 1
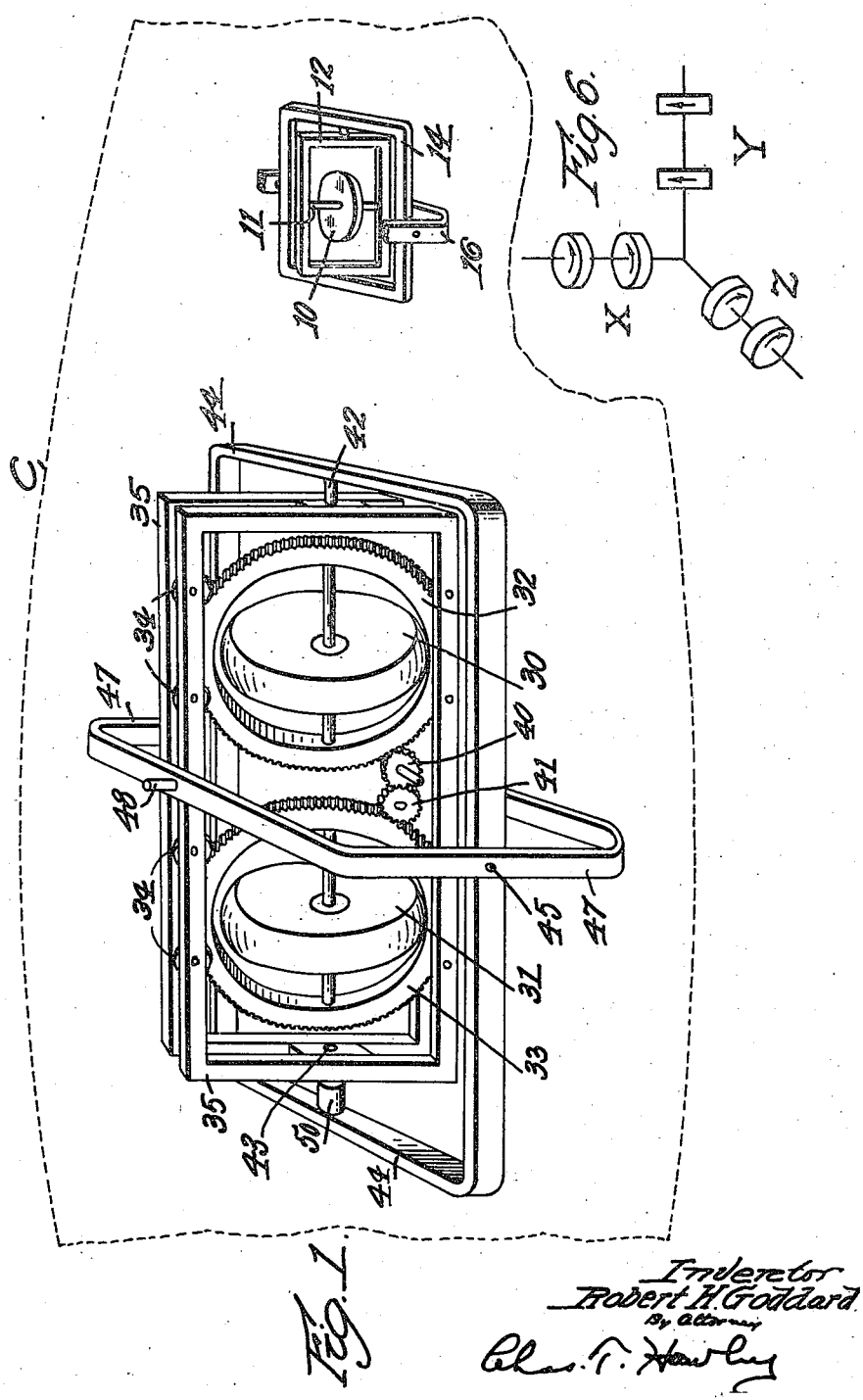

Dec. 12, 1939.   R. H. GODDARD   2,183,314
GYROSCOPIC APPARATUS FOR DIRECTING FLIGHT
Filed Jan. 31, 1939   2 Sheets—Sheet 2
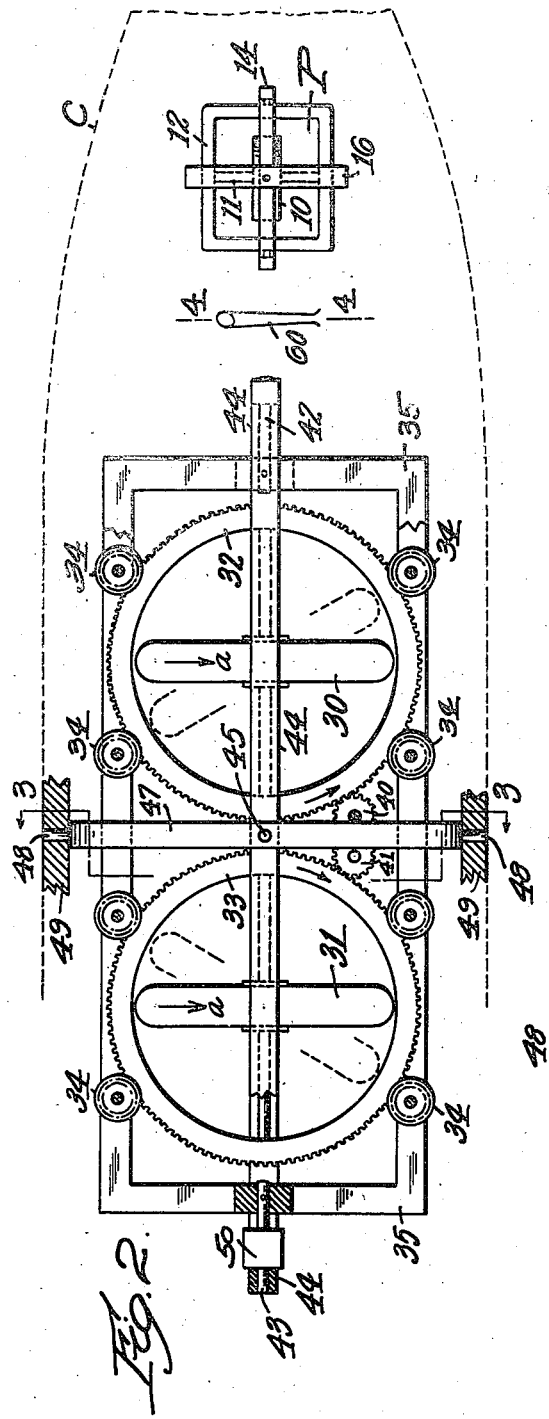
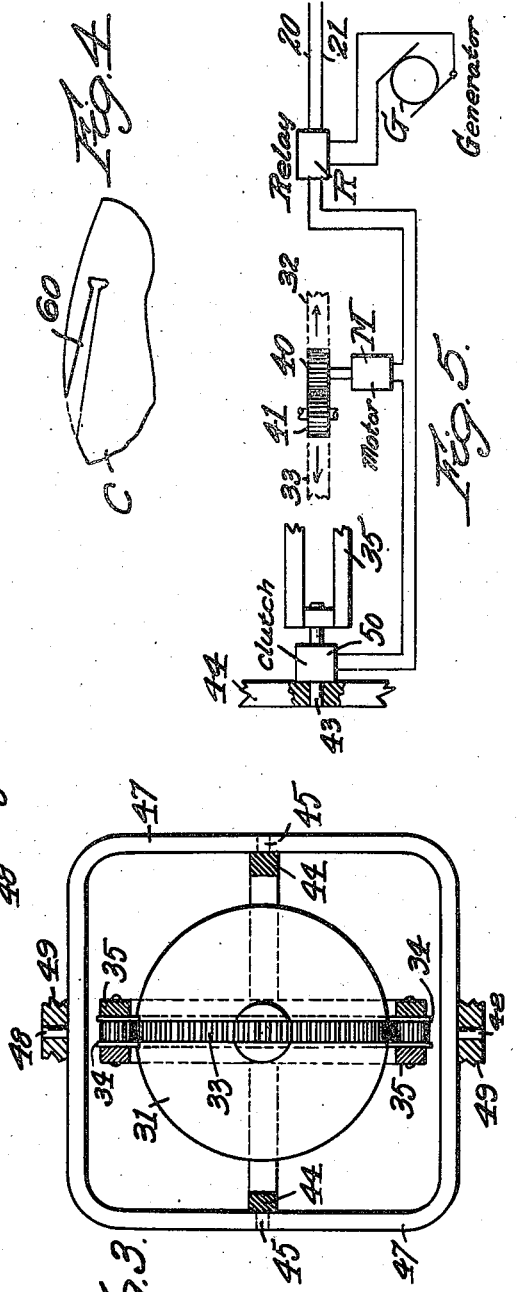
Inventor
Robert H. Goddard
By attorney
Chas. T. Hawley Patented Dec. 12, 1939

2,183,314

UNITED STATES PATENT OFFICE 2,183,314

GYROSCOPIC APPARATUS FOR DIRECTING FLIGHT

Robert H. Goddard, Roswell, N. Mex.

Application January 31, 1939, Serial No. 253,860

9 Claims. (Cl. 244—79)

This invention relates to apparatus for directing the flight of aircraft in outer space and beyond normal atmospheric conditions. While the invention is of somewhat general application, it is more particularly adapted to aircraft which are propelled by the discharge of gases or vapors therefrom, such as rockets or rocket planes.

One form of gyroscopic apparatus by which this general result may be attained is shown in my prior application Serial No. 109,964, filed by me November 9, 1936.

It is the general object of my present invention to improve the construction shown and described in my prior application by providing means to confine the effectiveness of each pair of steering or control gyroscopes to reactions about a single axis, and to render all other reactions of said pair of gyroscopes inoperative or non-effective.

A more specific object of the invention is to provide means for operatively connecting each pair of gyroscopes to the aircraft only during periods of angular adjustment of the rotating gyroscope members relative to the selected axis.

In the preferred embodiment of my invention, the frame which supports each pair of steering or control gyroscope members is normally mounted for free angular movement about three mutually perpendicular axes, but said frame is automatically held from movement about one selected axis during any angular adjustment of the planes of rotation of said two gyroscope members in said frame and relative to each other.

My invention further relates to arrangements and combinations of parts which will be hereinafter described and more particularly pointed out in the appended claims.

A preferred form of the invention is shown in the drawings, in which

Fig. 1 is a perspective view of one of my improved control gyroscopes, together with a pilot gyroscope therefor;

Fig. 2 is a side view of the control and pilot gyroscopes shown in Fig. 1;

Fig. 3 is a transverse sectional elevation, taken along the line 3—3 in Fig. 2;

Fig. 4 is a detail sectional view, taken along the line 4—4 in Fig. 2;

Fig. 5 is a wiring diagram to be described; and

Fig. 6 shows a diagrammatic arrangement of three pairs of gyroscopes.

My invention relates to the general type of aircraft described at length in my prior application, and contemplates the use of three pairs of control gyroscopes, supervised by pilot gyroscopes and collectively adapted to correct flight about longitudinal, vertical or horizontal axes, or about any three mutually perpendicular axes. Each pair of gyroscopes rotate in the same direction in their normal positions, as shown in Fig. 2.

In order to simplify the drawings, I have shown only a single set of control and pilot gyroscopes, mounted to control angular displacement or rolling of the aircraft about its longitudinal axis. Similar equipment will be provided to control flight with respect to transverse vertical and horizontal axes, as shown in Fig. 6, where pairs of gyroscopes X, Y and Z control movement about vertical, longitudinal and transverse axes respectively.

The pilot gyroscope P comprises a gyroscope member 10 mounted on a shaft 11 which is pivoted in a gimbal frame 12. The frame 12 is mounted in a gimbal ring 14 which in turn is mounted in an outer gimbal ring or frame 16, which latter frame is fixed in the aircraft C which is indicated generally in Figs. 1 and 2.

The gyroscope member 10 is continuously rotated at high speed by driving mechanism, not shown but commonly electric. When the gyroscope member 10 is displaced from its normal plane of rotation relative to the craft C, either by manual adjustment or by an angular or rolling motion of the craft, contacts are completed through wires 20 and 21 (Fig. 5) to effect closing of a switch in a relay R (Fig. 5), interposed between a generator G and a reversible motor M by which relative angular adjustment of the control gyroscope members is effected.

For a more complete description of the pilot gyroscope and the connections therefrom to the relay R, reference is made to my prior application above identified.

The control gyroscope system associated with the pilot gyroscope P comprises a pair of gyroscope members 30 and 31, rotatably mounted in gimbal rings 32 and 33, which rings are externally provided with gear teeth and are each positioned by a plurality of flanged pinions 34 loosely pivoted on a double supporting frame 35.

A pinion 40 is connected for rotation by the motor M and engages the ring gear 32, and a pinion 41 is interposed between the pinion 40 and the ring gear 33. Consequently, when the motor M is energized, the ring gears 32 and 33 are simultaneously rotated in opposite directions.

The frame 35 is provided with bearing studs 42 and 43, pivotally mounted in a gimbal frame 44, which in turn is supported by studs 45 pivoted in a transverse gimbal ring 47, and this transverse ring 47 is pivoted on studs 48 in a support 49 mounted in fixed position in the aircraft.

The construction of the gyroscope members 30 and 31 and the manner of mounting and adjusting said members in the frame 35 is similar to the construction shown and described in my prior application, but the frame 35 in said application is fixed in the aircraft, whereas in the present construction the frame 35 is pivotally mounted in the gimbal frame 44, which in turn is pivoted in the transverse gimbal frame 47 for purposes to be explained.

A holding device 50 is mounted on the frame 44 and is adapted to engage the supporting stud 43 of the frame 35 and to prevent angular movement thereof in the frame 44 when so engaged. The device 50 may comprise a brake or clutch of any usual form but is preferably a magnetic clutch connected in series with the motor M and relay R as shown in Fig. 5.

The connections are such that when the relay is closed by the pilot gyroscope to connect the generator G to the motor M, the clutch 50 will be simultaneously energized to lock the frame 35 in the gimbal frame 44, which condition will continue so long as the motor M continues to operate in either direction.

The gyroscope members 30 and 31 may be made hollow and may be utilized for storage of gasoline, and this gasoline may be withdrawn or discharged therefrom during the flight of the aircraft, all as fully described in my prior application.

During such discharge, however, the gyroscopes 30 and 31 will preferably be rotating in the same direction and in parallel planes, as indicated by the arrows a in Fig. 2, and a reaction will be produced by such discharge, tending to roll the craft about its longitudinal axis. To correct this temporary condition, I may conveniently provide two or more rocket nozzles 60 (Figs. 2 and 4) adapted to discharge combustion gases approximately circumferentially of the aircraft and with sufficient force to counteract the effect of the discarge of gasoline from the rotating gyroscope members.

Having described the details of construction of a preferred form of apparatus for carrying out my invention, I will now describe the operation thereof in directing the flight of an aircraft.

Assuming that an outside force, such as a transverse air current, initiates a rolling motion of the craft about its longitudinal axis, the resulting displacement of the pilot gyroscope P will act through suitable circuit-closing devices fully described in my prior application to cause the motor M to operate and to angularly adjust the gyroscope members 30 and 31 simultaneously in opposite directions. After the displacing force has been overcome and the craft has been turned back through half the angle of displacement, the motor M will be automatically reversed and will gradually return the gyroscopes to some intermediate position, such as is shown in dotted lines in Fig. 2, thereby restoring the craft to its original angular position and permanently neutralizing the displacing external force.

In such a final intermediate position, in which the axes of the gyroscope members are inclined to the longitudinal axis of the craft, certain small proportional parts of the angular momentum may tend to turn the craft about its longitudinal, vertical and horizontal axes, if the gyroscope frame, as 35, is fixed in the craft.

If the members 30 and 31 are of exactly the same mass and are rotating at exactly the same speed and are in all other respects symmetrical in relation to all three axes, the displacing forces of the two gyroscope members will be exactly balanced, so that the net diverting force exerted on the craft is zero. In actual practice, however, it is not possible to maintain two gyroscopes in exactly the same condition as to mass, speed and balance, and consequently unbalanced forces are developed which tend to divert the craft when the members 30 and 31 assume any such position as is shown in dotted lines in Fig. 2, if the frame 35 is fixed. This diverting tendency obviously increases as the displacement of the members 30 and 31 from full line position increases.

By mounting the frame 35 in the pivoted gimbal frame members 44 and 47, this disturbing force is rendered inoperative to effect the flight of the craft when the frame 35 is free. When the frame 35 is clamped in the frame member 44 by the magnetic clutch 50, the gyroscope members are then effective to counteract and correct a rolling displacement of the craft about its longitudinal axis. Only during this relatively brief and infrequent period of clutch operation can the disturbing forces effect the flight of the craft and such brief effect is negligible, particularly as it occurs only when the gyroscopes 30 and 31 are in corrective operation.

Otherwise stated, the supporting frame 35 normally turns freely on its pivots 42 and 43 and is also free to adjust itself about the pivots 45 and 48, but when the frame 35 is clamped by the clutch 50, the gyroscope members 30 and 31, if well matched, are able to exert a correcting influence and to counteract an external force tending to roll the craft about its longitudinal axis without introducing appreciable rotational disturbances. Consequently, substantial displacement of the members 30 and 31 from initial parallel relation does not interfere with the direction of flight if my present construction is used, while some such interference may occur if the frame 35 is wholly fixed in the craft and the momenta of the members 30 and 31 are not at all times substantially equal and opposite.

To summarize the method of control herein described, a comparatively large amount of angular momentum is stored on the craft about three directions at right angles, before the take-off. This angular momentum may be utilized without net change in amount in steering the craft, and can be used up wholly or in part, in overcoming the tendency of outside forces to rotate or change the direction of the craft. Moreover, each of the three angular momenta may be used independently, and neither will produce nor interfere with any movement of the craft about either of the other two axes.

Having thus described my invention and the advantages thereof, I do not wish to be limited to the details herein disclosed, otherwise than as set forth in the claims, but what I claim is:

1. Apparatus for directing the flight of an aircraft in outer space which comprises a pair of associated rotating gyroscope members mounted for precessional movement in supports which are separately rotatable in a supporting frame, a pilot gyroscope, means under control of said pilot gyroscope effective to precessionally displace the gyroscope members equally in opposite directions, thereby causing said gyroscope members to exert a flight-adjusting force on said aircraft in space in opposition to a diverting external force, means to support said frame in said craft so that all reactions of said gyroscope members are normally inoperative to direct flight, and automatic means controlled by said pilot gyroscope by which said members may be at times rendered effective to direct flight with respect to a selected axis only of said craft.

2. Apparatus for directing the flight of an aircraft in outer space which comprises a pair of associated rotating gyroscope members mounted for precessional movement in supports which are separately rotatable in a supporting frame, which is pivotally mounted in said craft, a pilot gyroscope, means under control of said pilot gyroscope effective to precessionally displace the gyroscope members equally in opposite directions, thereby causing said gyroscope members to exert a flight-adjusting force on said aircraft in space in opposition to a diverting external force, and automatic means to hold said supporting frame from movement on its pivots while said displacing means is in operation but leaving said supporting frame otherwise free to turn on its pivots.

3. Apparatus for directing the flight of an aircraft in outer space which comprises a pair of associated rotating gyroscope members mounted for precessional movement in supports which are separately rotatable in a supporting frame which is pivotally mounted in said craft, a pilot gyroscope, an electric motor under control of said pilot gyroscope and effective to precessionally displace the gyroscope members equally in opposite directions, thereby causing said gyroscope members to exert a flight-adjusting force on said aircraft in space in opposition to a diverting external force, and a magnetic clutch operatively associated with said motor and effective to hold said supporting frame from angular movement on its pivots while said motor is in operation but leaving said supporting frame otherwise free to turn on its pivots.

4. Apparatus for directing the flight of an aircraft in outer space which comprises a pair of associated rotating gyroscope members mounted for precessional movement in supports which are separately rotatable in a supporting frame, inner and outer gimbal rings, said frame being pivotally mounted in said inner ring and said outer ring being pivotally mounted in said craft, a pilot gyroscope, means under control of said pilot gyroscope effective to precessionally displace the gyroscope members equally in opposite directions, thereby causing said gyroscope members to exert a flight-adjusting force on said aircraft in space in opposition to a diverting external force, and automatic means to hold said supporting frame fixed relative to said inner gimbal ring while said displacing means is in operation but leaving said supporting frame otherwise free to turn on its pivots.

5. Apparatus for directing the flight of an aircraft in outer space which comprises a pair of associated rotating gyroscope members mounted for precessional movement in supports which are separately rotatable in a supporting frame, inner and outer gimbal rings, said frame being pivotally mounted in said inner ring and said outer ring being pivotally mounted in said craft, a pilot gyroscope, an electric motor under control of said pilot gyroscope and effective to precessionally displace the gyroscope members equally in opposite directions, thereby causing said gyroscope members to exert a flight-adjusting force on said aircraft in space in opposition to a diverting external force, and a magnetic clutch operatively associated with said motor and effective to hold said supporting frame in fixed relation to said inner gimbal ring while said motor is in operation but leaving said supporting frame otherwise free to turn on its pivots.

6. Apparatus for directing the flight of an aircraft in outer space which comprises a pair of associated rotating gyroscope members mounted for precessional movement in supports which are separately rotatable in a supporting frame, which is pivotally mounted in said craft, said gyroscope members having substantial equal moments of inertia, means to rotate said gyroscopes at substantially equal speeds and in the same direction, a pilot gyroscope, means under control of said pilot gyroscope effective to precessionally displace the gyroscope members equally in opposite directions, thereby causing said gyroscope members to exert a flight-adjusting force on said aircraft in space in opposition to a diverting external force, and automatic means to hold said supporting frame from movement on its pivots while said displacing means is in operation but leaving said supporting frame otherwise free to turn on its pivots.

7. Apparatus for directing the flight of an aircraft in outer space which comprises means to store angular momentum in said craft, means to normally prevent said momentum from affecting the flight of said craft in any direction, and automatic means to utilize a portion of said momentum to overcome an outside force tending to turn said craft about a selected axis.

8. Apparatus for directing the flight of an aircraft in outer space which comprises means to store angular momentum in said craft in three directions at right angles to each other, means to normally prevent said momentum from affecting the flight of said craft in any direction, and automatic means to utilize a portion of said momentum to overcome an outside force tending to turn said craft about a selected axis.

9. Apparatus for directing the flight of an aircraft in outer space which comprises means to store angular momentum in said craft in three directions at right angles to each other, means to normally prevent said momentum from affecting the flight of said craft in any direction, and automatic means to utilize a portion of said momentum to overcome an outside force tending to turn said craft about a selected axis and to prevent a change in stored momentum thus produced from affecting the flight of the craft.

ROBERT H. GODDARD.